Patented Oct. 27, 1953

2,657,246

UNITED STATES PATENT OFFICE 2,657,246

SELECTIVE POLYMERIZATION OF ISOBUTYLENE

Helmuth G. Schneider, Westfield, and Hans G. Goering, Elizabeth, N. J., assignors to Standard Oil Development Company, a corporation of Delaware No Drawing. Application April 21, 1950, Serial No. 157,400

9 Claims. (Cl. 260—683.15)

This invention relates to the polymerization of isobutylene and more particularly relates to the selective polymerization of isobutylene from its admixture with other low-boiling olefins under such conditions as will result in the production of polymers of narrow ranges of high viscosity and high viscosity index, having molecular weights below 4000 Staudinger.

It is well known that the olefins in a $C_4$ cut can be polymerized with solid aluminum chloride catalyst to give polymers having Saybolt viscosities at 210° F. of 40 to 20,000. In this process the $C_4$ hydrocarbons are circulated through a bed of solid aluminum chloride, thus providing at all times a large excess of catalyst to olefin in the reaction zone. It is also known that isobutylene can be polymerized with aluminum chloride to give a similar molecular weight polymer. In polymerizing the isobutylene it has always been considered necessary to remove contaminating olefins such as butene-1, butene-2, etc., if a constant composition product is desired. Furthermore, the products formed cover a broad viscosity range and must be fractionated to desired grades.

It has now been found that by the addition of the catalyst to the $C_4$ hydrocarbon mixture in small quantities, i. e. in amounts slightly in excess of that required to initiate polymerization, substantially complete and selective removal of isobutylene from the $C_4$ cut can be obtained. Furthermore, the amount of catalyst can be so adjusted that only part of the olefins, in the feed, are polymerized and thus the viscosity of the product can be controlled. The reaction products may be steam stripped to give the desired product since only a relatively small proportion of light ends are formed. Vacuum fractionation is not necessary.

As source material for the mixture of $C_4$ hydrocarbons found suitable for the practice of this invention, use is made of the olefin-containing gases generally produced in the thermal cracking of petroleum crude oils, distillates, or residuum, although it will be apparent that other olefin-containing materials may serve as well. These olefin-containing cracking still gases are fractionated or otherwise treated for the recovery of the four-carbon atom olefins, including butene-1, butene-2, and isobutene and the associated saturated hydrocarbons. Such a fraction may also contain other hydrocarbons, both saturated and unsaturated in small amounts. The following is an analysis of a typical $C_4$ cut:

|  | Percent by volume |
|---|---|
| Propane | 0.0 |
| Isobutane | 18.7 |
| n-Butane | 46.7 |
| Isobutylene | 11.9 |
| Butene-1 | 9.2 |
| Cis butene-2 | 3.8 |
| Trans butene-2 | 5.8 |
| Butadiene | 0.4 |
| $C_5+$ | 3.5 |

The polymerization reaction is preferably, although not in all cases, carried out at temperatures below atmospheric. Generally, temperatures excessively below atmospheric are of no particular benefit. Ordinarily temperatures are employed within the range —40° F. to 120° F., corresponding to the range of about —40° C. to about 50° C.

Catalysts suitable for the polymerization reaction according to this invention include solid catalysts of the Friedel-Crafts type, such as aluminum chloride, aluminum bromide, titanium tetrachloride, uranium chloride, zirconium tetrachloride and the like. The catalyst is added in small quantities, slightly in excess of that needed to initiate the reaction. The reaction may be carried out in any desired manner so long as a large excess catalyst is not used. A very simple and practical method of operating consists in carrying out the reaction at the boiling point of the $C_4$ cut (0° C.) using a reflux condenser to return the vaporized hydrocarbon mixture to the reaction zone.

The amount of catalyst added must be controlled in order to selectively remove the tertiary olefin. The catalyst is best employed in the solid form but it may also be used as a solution in a solvent which forms no complex with the catalyst. Suitable solvents are the alkyl halides such as methyl and ethyl chlorides. When the catalyst is used in the solid form the amount may vary between 0.01 and 2.15% by weight of the feed.

When a dissolved catalyst is used, the amount of catalyst added is much smaller since the catalyst is much more efficient. In this case the range is between 0.005 and 1.0% by weight of the total olefins in the feed.

One of the fundamental advantages of the present invention lies in the fact that it results in the preparation of a product having a very specific viscosity range without the necessity of fractionation. The prior art processes using large quantities of aluminum chloride result in the preparation of polymers having a wide viscosity range. These must be separated by fractionation to give a specific viscosity product. According to the present process a desired viscosity product can be obtained by control of the reaction time, catalyst concentration, temperature, and content of isobutylene in feed.

The reaction is usually complete in five to ten minutes. Continued reaction increases the yield only slightly and causes a slow viscosity lowering.

The polymer yield and viscosity vary little over a catalyst concentration of range of 0.01% to 1.67% based on the feed, but catalyst concentrations up to 2.15% based on the feed are suitable.

Polymer yield increases but viscosity decreases with increasing temperature. Both polymer yield and viscosity increase as the concentration of the isobutylene in the feed is increased.

The process may be carried out either batchwise or continuously. Generally continuous polymerization gives lower yields than batch when polymerizing to a given viscosity and gives polymers of lower viscosity than those made batchwise when polymerizing to a given conversion level. Conversion is the most important variable outside of the catalyst concentration in obtaining the desired viscosity product.

The invention is desirably carried out in the following manner. A $C_4$ naptha of known composition is first charged to a precooled reactor and the desired operating temperature attained, either by internal or external cooling. The catalyst is then added in very slight excess and the reaction allowed to continue for five to ten minutes or more as desired. At the end of this time the batch (with or without filtration) is contacted with water to neutralize the catalyst. Unreacted hydrocarbons are stripped from the product solution by heating over water to 100° C. Higher boiling light ends are steam stripped from the polymer product at 150°–200° C. and the polymer is identified by viscosity determination.

When the above process is carried out continuously the feed is charged continuously to a reflux-type reactor or a reactor fitted with external or internal refrigeration with an overflow tube to maintain a constant reactor volume. The conversion level in the reactor is determined by the high boiling polymer content of a spot sample of the effluent polymer solution, or by olefinic analysis of the spent naphtha. The formation of polymer is controlled by regulating the rate of addition of the catalyst. The effluent polymer solution may be filtered and then immediately treated with water or alcohol to kill the catalytic reaction or may be contacted with alcohol and/or water directly after leaving the reaction zone.

The process of the present invention is applicable for the preparation of a desired narrow range viscosity product from either a pure or impure feed. When employing an impure feed such as a $C_4$ naphtha, the process is selective. Isobutylene is first polymerized, then butene-1, and finally butene-2. If it is desired to polymerize only the isobutylene, the amount of catalyst and time of contact is controlled to selectively polymerize the material. After the isobutylene has been removed, the spent $C_4$ naphtha can be further contacted with catalyst to polymerize the butene-1 or the amount of catalyst originally used can be increased and the contact time continued until both isobutylene and butene-1 have been polymerized. In this latter case the amount of catalyst initially used is about 5%. When selectively polymerizing butene-1, the isobutylene may be removed in any manner known to the art, such as by extraction with sulfuric acid, etc. prior to contacting with the $AlCl_3$ catalyst.

In order to properly understand the present invention, the following examples are given:

EXAMPLE I

The following data illustrates the small amount of solid $AlCl_3$ catalyst needed at the $C_4$ boiling point (0° C.) to yield the high viscosity type polymers:

Table 1.—Effect of catalyst concentration on polymerization of $C_4$ naphtha

A. OPERATING CONDITIONS AND PRODUCT EVALUATION

Equipment—5 liter, round bottom, 3 neck flask. Attachments—Dry Ice—alcohol reflux condenser, agitator (mercury seal type), low temperature thermometer.
Charge—2 liters (1200 gms.) refinery $C_4$ naphtha (see below for analysis).
Catalyst—solid $AlCl_3$ (powdered).
Temp.—0° C. Pressure—atmospheric (i. e. reactions run at boiling point.
Time—30 min.

| Run No. | Catalyst conc. (wt. percent $AlCl_3$ added on total $C_4$) | Yield (wt. percent on total $C_4$) | Catalyst efficiency (gms. polymer/gm. catalyst) | Product evaluation Steam distilled at 200° F. | |
|---|---|---|---|---|---|
| | | | | Percent polymer oil (per cent on crude polymer) | Viscosity of steamed polymer (centistokes at 210° F.) |
| 1* | 0.08 | 10.9 | 131 | 5 | 3,748 |
| 2 | 0.17 | 10.0 | 60 | 7.5 | 4,240 |
| 3 | 0.83 | 12.0 | 14.4 | 5 | 4,610 |
| 4 | 1.67 | 12.5 | 12.5 | 9 | 3,387 |

B. ANALYSES OF $C_4$ NAPHTHA FEED

| Component | Liquid vol. percent |
|---|---|
| $C_3$ | 0 |
| Isobutane | 21.0 |
| n-Butane | 48.0 |
| Isobutylene | 10.6 |
| Butene-1 | 9.0 |
| Cis butene-2 | 3.5 |
| Trans butene-2 | 5.8 |
| Butadiene | 0.5 |
| $C_5+$ | 1.6 |

*4 liters $C_4$ naphtha used in this run. Two gms. $AlCl_3$ reacted with 2 liters $C_4$ naphtha for 30 min. Then added 2 liters $C_4$ naphtha and reacted for 30 min. additional.

From the data in Table 1 it is evident that the reaction stops with the depletion of the tertiary olefin.

EXAMPLE II

To show the criticalness of the quantity of catalyst in effecting selective polymerization, the following data are given wherein $AlCl_3$ in a non-complex forming solvent is used.

Table 2.—*Effect of liquid catalysts-AlCl₃ dissolved in ethyl chloride*

A. OPERATING CONDITIONS AND PRODUCT EVALUATION

Equipment—5 liter, round bottom, 3 neck flask. Attachments—Dry Ice—alcohol reflux condenser, agitator, low temperature thermometer.
Charge—2 liters (1200 gms.) refinery $C_4$ naphtha (see part B for analyses).
Catalyst—5 gms. AlCl₃/100 ml. ethyl chloride (solution).
Temp.—0° C. Pressure—atmospheric (i. e. reactions run at boiling point).
Time—30 min.

| Run No. | Catalyst conc. (wt. percent AlCl₃ added on total $C_4$) | Yield (wt. percent) on total $C_4$ | Catalyst efficiency (gms. polymer/gm. catalyst) | Product evaluation Steam distilled at 200° C. | |
|---|---|---|---|---|---|
| | | | | Percent polymer oil (per cent on crude polymer) | Viscosity of steamed polymer (centistokes at 210° F.) |
| 5 | 0.063 | 4.4 | 71 | | 1,448 |
| 6 | 0.083 | 13.6 | 163 | 5.5 | 2,678 |
| 7 | 0.208 | 20.2 | 97 | 15.0 | 684 |
| 8 | 0.625 | 26.7 | 42.7 | 22.5 | 416 |
| 9 | 0.833 | 27.9 | 33.5 | 23.0 | 287 |

B. ANALYSES OF SPENT NAPHTHA (LIQUID VOLUME PERCENT)

| Run No. | | 6 | 7 |
|---|---|---|---|
| Polymer yield (wt. percent) | | 13.6 | 20.2 |

| Component | Feed charged | | |
|---|---|---|---|
| $C_3$ | 0 | 0 | 0 |
| Isobutane | 21.0 | 24.4 | 23.3 |
| n-Butane | 48.0 | 54.4 | 58.5 |
| Isobutylene | 10.6 | 0.0 | 0.5 |
| Butene-1 | 9.0 | 8.9 | 2.4 |
| Cis butene-2 | 3.5 | 4.6 | 5.2 |
| Trans butene-2 | 5.8 | 6.3 | 7.3 |
| Butadiene | 0.5 | 0.1 | 0.1 |
| $C_5+$ | 1.6 | 1.3 | 2.7 |

The above data show that for 0.083% by weight to 0.833% by weight dissolved aluminum chloride added, the yield of polymer increased from 13.6 to 27.9% while a catalyst efficiency decreased from 163 to 33.5 grams polymer per gram of catalyst. When 0.063% by weight of aluminum chloride was used, a yield of 4.4% was realized with a catalyst efficiency of only 71. This indicates that a certain initial amount of catalyst is necessary to counteract the probable poisons, such as water and sulfur compounds in the system. The drop in catalyst efficiency with increasing amounts of added catalyst is due to increased resistance to polymerization of butene-1 and butene-2 as compared to isobutylene. A comparison of the spent feed in runs 6 and 7 shows that all of the isobutylene and practically none of the other olefins were polymerized when only 0.083% of catalyst was used but that increased amounts of catalyst over this resulted in increasing amounts of the other olefins (butene-1) being polymerized.

EXAMPLE III

The following data illustrate the effect of contact time on the polymerization of isobutylene in $C_4$ naphtha when the amount of feed and catalyst are held constant.

Table 3.—*Effect on contact time on polymerization of $C_4$ naphtha*

A. OPERATING CONDITIONS AND PRODUCT EVALUATION

Equipment—5 liter, round bottom, 3 neck flask. Attachments—Dry Ice—alcohol reflux condenser, agitator (mercury seal type), low temperature thermometer.
Charge—2 liters (1200 gms.) refinery $C_4$ naphtha (see part B for analysis).
Catalyst—0.83% solid AlCl₃ (powdered) based on total $C_4$ naphtha.
Temp.—0°C. Pressure—atmospheric (i. e. reactions run at boiling point).

| Run No. | Time (min.) | Yield (wt. percent on total $C_4$) | Catalyst efficiency (gms. polymer/gm. catalyst) | Product evaluation Steam distilled at 200° C. | |
|---|---|---|---|---|---|
| | | | | Percent polymer oil (percent on crude polymer) | Viscosity of steamed polymer (centistokes at 210° F.) |
| 10 | 10 | 11.4 | 13.7 | 3 | 4,438 |
| 11 | 30 | 12.0 | 14.4 | 5 | 4,610 |
| 12 | 60 | 14.2 | 17.0 | 4 | 3,838 |
| 13 | 180 | 15.3 | 18.4 | 9 | 2,118 |

B. ANALYSES OF SPENT NAPHTHA (LIQUID VOLUME PERCENT)

| Run No. | | 10 | 11 | 13 |
|---|---|---|---|---|
| Contact time min. | | 10 | 30 | 180 |
| Polymer yield (wt. percent) | | 11.4 | 12.0 | 15.3 |

| Component | Feed charged | | | |
|---|---|---|---|---|
| $C_3$ | 0 | 0 | 0 | 0 |
| Isobutane | 21.0 | 22.8 | 21.9 | 23.6 |
| n-Butane | 48.0 | 57.2 | 56.4 | 57.4 |
| Isobutylene | 10.6 | 0.5 | 0.4 | 0.4 |
| Butene-1 | 9.0 | 9.4 | 10.6 | 7.3 |
| Cis butene-2 | 3.5 | 3.2 | 3.2 | 4.0 |
| Trans butene-2 | 5.8 | 5.8 | 6.3 | 7.2 |
| Butadiene | 0.5 | 0.1 | 0.3 | 0.1 |
| $C_5+$ | 1.6 | 1.0 | 0.9 | 0 |

Part A of the above data shows that the yield of crude polymer varies but little with extended reaction time at the $C_4$ naphtha boiling point, 11 to 15% in a span of 10 to 180 minutes. The reaction is quite rapid for the first 5 to 10 minutes. An examination of the products shows that there is a gradual reduction in the viscosity of the steam-distilled polymer with reaction time. Also the quantities of light "polymer oils" increases. The selective nature of the process is also indicated. Isobutylene is polymerized during the first rapid stage of the reaction (5-10 minutes). Following this the secondary olefins are attacked, butene-1 polymerizing faster than butene-2.

EXAMPLE IV

The following data illustrate the effect of temperature on the products:

Table 4.—Effect of temperature on polymerization of $C_4$ naphtha

A. OPERATING CONDITIONS AND PRODUCT EVALUATION

Equipment—5 liter, round bottom, 3 neck flask—attachments—reflux condenser, Dry Ice-alcohol external cooling bath, agitator, low temperature thermometer.
Charge—2 liters (1200 gms.) refinery $C_4$ naphtha (see part B for analysis).
Catalyst—0.33% solid $AlCl_3$ (powdered) based on total $C_4$ naphtha.
Pressure—atmospheric.

| Run No. | Time (min.) | Temp. (°C.) | Yield (wt. percent on total $C_4$) | Catalyst efficiency (gms. polymer/gm. catalyst) | Product evaluation Steam distilled at 200° F. | |
|---|---|---|---|---|---|---|
| | | | | | Percent Polymer oil (percent on crude polymer) | Viscosity of steamed polymer (centistokes at 210° F.) |
| Part (A-1): | | | | | | |
| 14 | 60 | −25 | 0.3 | 00.8 | | |
| 15 | 60 | −15 | 6.9 | 20.8 | | 35,396 |
| 16 | 60 | −7 | 13.5 | 39.3 | 1.5 | 8,622 |
| 17 | 60 | −5 | 13.8 | 41.5 | 1.5 | 7,568 |
| 18 | 60 | −1 | 13.9 | 41.8 | 3.0 | 5,326 |
| Part (A-2): | | | | | | |
| 14 | 60 | −25 | 0.3 | 00.8 | | |
| 19 | 240 | −25 | 7.0 | 21.0 | | 103,560 |
| 15 | 60 | −15 | 6.9 | 20.8 | | 35,396 |
| 20 | 180 | −15 | 13.8 | 41.5 | 1.5 | 26,280 |

B. ANALYSES OF SPENT NAPHTHA (LIQUID VOLUME PERCENT)

| Component | Feed | Run 20 −15° C. | Run 19 −25° C. |
|---|---|---|---|
| $C_3$ | 0 | 0 | 0 |
| Isobutane | 18.7 | 22.1 | 21.7 |
| n-Butane | 46.7 | 56.2 | 49.9 |
| Isobutylene | 11.9 | 0.3 | 6.7 |
| Butene-1 | 9.2 | 10.1 | 11.1 |
| Cis butene-2 | 3.8 | 3.8 | 4.0 |
| Trans butene-2 | 5.8 | 6.5 | 6.0 |
| Butadiene | 0.4 | 0.2 | 0.1 |
| $C_5+$ | 3.5 | 0.8 | 0.5 |

The above data show that the polymer yield varies with temperature, increasing from 0.3% at −25° C. to 13.9% at −1° C. for a reaction time of 60 minutes. The viscosities at 210° F. of the products vary inversely with reaction temperature from a viscosity of 35,000 cs. at 210° F. for a reaction temperature of −15° C. to 5,300 cs. at 210° F. for a reaction at −1° C. It is also evident that the speed of the reaction is reduced as the reaction temperature is decreased. Thus by increasing the reaction time at −25° C. for 1 to 4 hours, the yield increased from 0.3% to 7.0%. The viscosity of the product obtained at this temperature was 103,000 cs. at 210° F. At −15° C. the yield of polymer increased from 6.9% to 13.8% by increasing the reaction time from 1 to 3 hours. The material produced at this temperature had 35,000 viscosity at 210° F. for one hour reaction and 26,000 cs. viscosity for 3 hours reaction time. The analysis data show that the tertiary olefins are polymerized selectively at all temperatures used.

EXAMPLE V

The data of Table 4 are concerned primarily with the polymerization at temperatures at or below the boiling point of the naphtha at atmospheric pressure. The above conclusions are further affirmed at higher reaction temperatures where the reaction is run in the liquid phase under pressure. Such data are given in Table 5. Here the reaction is conducted at temperatures between 27° C. and 38° C. It is to be noted that here again the viscosity of the product decreases with increasing temperatures; also that the selectivity of polymerization can be controlled. In runs 21 and 22 for example only the isobutylene has reacted in 20 minutes contact time whereas at higher temperatures at the same contact time the isobutylene, the butene-1, and some butene-2 has reacted.

Table 5.—Effect of elevated temperature on polymerization of $C_4$ naphtha

A. OPERATING CONDITIONS AND PRODUCT EVALUATION

Equipment—5 liter, metal-jacketed reactor, tap water cooling, agitator, room temperature thermometer.
Charge—2 liters (1200 gms.) refinery $C_4$ naphtha.
Catalyst—0.33% solid $AlCl_3$ (Ohio Apex-sublimed) based on total $C_4$ naphtha.
Contact Time—20 minutes.

| Run No. | Temp. (°C.) | Pressure, lbs./sq. in. | Viscosity of steam-distilled polymer (centistokes at 210° F.) |
|---|---|---|---|
| 21 | 27 | 25 | 92.5 |
| 22 | 28 | 26 | 122.0 |
| 23 | 30 | 28 | 55.7 |
| 24 | 38 | 38 | 30.3 |

B. ANALYSES OF SPENT NAPHTHAS (LIQUID VOLUME PERCENT)

| Component | Feed | Run 21 27° C. | Run 22 28° C. | Run 23 30° C. | Run 24 38° C. |
|---|---|---|---|---|---|
| Isobutane | 16.9 | 21.4 | 17.5 | 19.1 | 24.8 |
| n-Butane | 35.5 | 45.1 | 44.5 | 51.6 | 54.3 |
| Isobutylene | 13.6 | 0.3 | 0.7 | 1.3 | 0.2 |
| Butene-1 | 12.4 | 10.1 | 12.1 | 3.9 | 2.0 |
| Butene-2 | 14.6 | 16.6 | 18.1 | 16.1 | 12.3 |
| Butadiene | 0.4 | 0.1 | 0.1 | 0 | 0 |
| $C_5+$ | 6.6 | 6.4 | 7.0 | 8.0 | 6.5 |

EXAMPLE VI

The following data are given to show the effect of the isobutylene concentration of the feed on the viscosity of the product.

Table 6.—Effect of isobutylene concentration of feed on polymerization of $C_4$ naphtha

A. OPERATING CONDITIONS AND PRODUCT EVALUATION

Equipment—5 liter, round bottom, 3 neck flask. Attachments—Dry Ice—alcohol reflux condenser, agitator (mercury seal type), low temperature thermometer.
Charge—2 liters (1200 gms.) $C_4$ naphtha (see below for analyses).
Catalyst—0.33% solid $AlCl_3$ (Ohio Apex—sublimed) based on total $C_4$ naphtha.
Temp.—0° C. Pressure—atmospheric (i. e. reactions run at boiling point).
Time—30 min.

| Run No. | Percent Isobutylene in feed (liquid vol. percent) | Yield (wt. percent on total $C_4$) | Catalyst efficiency (gms. polymer/gm. catalyst) | Product evaluation steam distilled at 150° C. | |
|---|---|---|---|---|---|
| | | | | Percent polymer oil (percent on crude polymer) | Visc. of steamed polymer (centistokes at 210° F.) |
| 25 | 6.2 | 6.7 | 20.0 | | 906 |
| 26 | 11.5 | 11.8 | 35.5 | 3 | 4,464 |
| 27 | 12.5 | 13.0 | 39.0 | 3 | 4,505 |
| 28 | 15.0 | 15.2 | 45.8 | 3.5 | 6,202 |
| 29 | 20.0 | 17.9 | 53.7 | 3 | 9,000 |

Table 6.—Effect of isobutylene concentration of feed on polymerization of $C_4$ naphtha—Continued

B. ANALYSES OF FEEDS (LIQUID VOLUME PERCENT)

| Run No. | 25 | 26 [1] |
|---|---|---|
| Component: | | |
| $C_3$ | 0 | 0.5 |
| Isobutane | 19.5 | 17.5 |
| n-Butane | 51.6 | 49.5 |
| Isobutylene | 6.2 | 11.5 |
| Butene-1 | 10.9 | 9.8 |
| Cis butene-2 | 3.9 | 4.6 |
| Trans butene-2 | 6.7 | 5.9 |
| Butadiene | 0.3 | 0.3 |
| $C_5+$ | 0.9 | 0.4 |

[1] Same feed as used for run No. 26 was used to make up the feeds containing higher concentrations of isobutylene. This was done by merely adding more isobutylene to the known plant stock.

The above data show that isobutylene present in $C_4$ naphtha feeds is polymerized selectively and almost quantitatively but that the viscosity increases with isobutylene concentration from 900 to 9000 cs. at 210° F. when the isobutylene content of the feed is increased from 6.2% to 20%.

EXAMPLE VII

The following data illustrate the effect of using aluminum bromide instead of aluminum chloride as the catalyst:

Table 7

A. OPERATING CONDITIONS AND PRODUCT EVALUATION

Equipment—5 liter, round bottom, 3 neck flask. Attachments—Dry Ice—alcohol reflux condenser, agitator, low temperature thermometer.
Charge—2 liters (1200 gms.) refinery $C_4$ naphtha (see part B for analysis).
Temp.—0° C. Pressure—atmospheric (reactions run at boiling point).
Time—30 min.

| Run No. | Type of $AlBr_3$ | Catalyst conc. (wt. percent on total $C_4$) | Yield (wt. percent on $C_4$) | Catalyst efficiency (gms. polymer/gm. catalyst) | Product evaluation Steam distilled at 200° C. | |
|---|---|---|---|---|---|---|
| | | | | | Percent poly. oil (percent on crude polymer) | Visc. of Polymer (centistokes at 210° F.) |
| 30 | Commercial | 0.83 | 12.5 | 15.0 | 8 | 3,630 |
| 31 | Refined | 0.83 | 11.8 | 14.2 | 8.5 | 4,100 |
| 32 | Large lumps | 0.17 | 3.8 | 22.5 | | 4,300 |
| 33 | Powder (ground) | 0.17 | 10.0 | 60.0 | 9.0 | 1,810 |

B. ANALYSIS OF $C_4$ NAPHTHA FEED

| Component | Liquid vol., percent |
|---|---|
| $C_3$ | 0 |
| Isobutane | 21.0 |
| n-Butane | 48.0 |
| Isobutylene | 10.6 |
| Butene-1 | 9.0 |
| Cis butene-2 | 3.5 |
| Trans butene-2 | 5.8 |
| Butadiene | 0.5 |
| $C_5+$ | 1.6 |

The above data show that aluminum bromide is as good as aluminum chloride as a catalyst.

EXAMPLE VIII

A series of experiments were carried out in which the feed was charged continuously and product was removed continuously. The effect of varying conversion level (per cent of unreacted isobutylene in the spent naphtha) on the product yield and quality is shown in the following data:

Table 8.—Effect of varying conversion level on continuous polymerization of $C_4$ naphtha

A. OPERATING CONDITIONS AND PRODUCT EVALUATION (Note.—Data shown for continuous runs was taken at relatively constant conversion levels only.)

Equipment—1 liter glass, reflux type, overflow reactor, run with 500 cc. holdup. Attachments—liquid feed blow case, reflux condenser, thermometer, agitator, product solution receptacle.
Feed—refinery $C_4$ naphtha (see part B for analysis).
Catalyst—solid $AlCl_3$ (sublimed).
Temp.—0° C. Pressure—atmospheric (i. e. polymerizations run at boiling point).
Contact Time—7.5 min. (8 reactor turnovers/hr.).

| Run No. | Catalyst conc. (wt. percent $AlCl_3$ on total $C_4$) | Yield (wt. percent on total $C_4$) | Catalyst efficiency (gms. polymer/gm. catalyst) | Product evaluation Steam distilled at 150° C. | |
|---|---|---|---|---|---|
| | | | | Percent polymer oil (per cent on crude polymer) | Viscosity of steamed polymer (centistokes at 210° F.) |
| 34 | 0.33 | 9.1 | 27.2 | 1.2 | 3,200 |
| 35 | 0.77 | 10.5 | 13.7 | 1.1 | 2,240 |
| 36 | 1.43 | 12.2 | 8.5 | 9.7 | 450 |
| 37 | 2.14 | 12.6 | 5.9 | 8.4 | 490 |

B. ANALYSES OF SPENT NAPHTHA (LIQUID VOLUME PERCENT)

| Run No. | | 34 | 35 | 36 | 37 |
|---|---|---|---|---|---|
| Wt. percent yield | | 9.1 | 10.5 | 12.2 | 12.6 |
| Component | Feed | | | | |
| $C_3$ | 0.5 | 0 | 0 | 0 | 0 |
| Isobutane | 17.5 | 19.6 | 19.8 | 18.9 | 20.0 |
| n-Butane | 49.5 | 52.6 | 54.3 | 56.9 | 56.6 |
| Isobutylene | 11.5 | 4.4 | 2.4 | 1.2 | 1.9 |
| Butene-1 | 9.8 | 10.5 | 12.0 | 10.6 | 9.1 |
| Cis butene-2 | 4.6 | 4.6 | 4.3 | 4.1 | 4.4 |
| Trans butene-2 | 5.9 | 7.1 | 6.4 | 7.1 | 6.9 |
| Butadiene | 0.3 | 0.4 | 0.2 | 0.2 | 0.2 |
| $C_5+$ | 0.4 | 0.8 | 0.4 | 1.0 | 0.9 |

The above data show that comparatively high viscosity polymers (2,240–3,200 cs. at 210° F.) are realized when running with feeds containing 11.5% isobutylene at conversion levels below 11%. At slightly higher levels, however, much lower viscosity material (450–490 cs.) is prepared along with larger fractions of steam-volatile polymer oils.

EXAMPLE IX

A series of experiments was carried out similar to Experiment VIII except that the isobutylene concentration in the feed was varied. The results of these experiments are shown in the following data:

Table 9.—*Effect of isobutylene concentration of feed on the continuous polymerization of $C_4$ naphtha*

A. OPERATING CONDITIONS AND PRODUCT EVALUATION (NOTE.—Data shown for continuous runs was taken at relatively constant levels only.)

Equipment—1 liter glass, reflux type, overflow reactor, run with 500 cc. holdup. Attachments—1 l. liquid feed—blow case, reflux condenser, thermometer, agitator, product solution receptacle.
Feed—refinery $C_4$ naphtha (see part B for analysis).
Catalyst—solid $AlCl_3$ (Ohio Apex—sublimed).
Temp.—0° C. Pressure—atmospheric (i. e. polymerizations run at boiling pt.).
Contact Time—7.5 min. (8 reactor turnovers/hr.).

| Run No. | $IsoC_4$ in feed (liquid vol. percent) | Catalyst conc. (wt. percent $AlCl_3$ on total $C_4$) | Yield (wt. percent on total $C_4$) | Catalyst efficiency (gms. polymer/ gm. catalyst) | Product evaluation Steam distilled at 150° F. | |
|---|---|---|---|---|---|---|
| | | | | | Percent polymer oil (percent on crude polymer) | Visc. of steamed polymer (centistokes at 210° F.) |
| 38 | 6.2 | 0.31 | 4.9 | 15.9 | 8.7 | 400 |
| 34 | 11.5 | 0.33 | 9.1 | 27.2 | 1.2 | 3,200 |
| 39 | 12.5 | 0.23 | 10.1 | 47.3 | 1.2 | 3,800 |
| 40 | 15.7 | 0.33 | 13.9 | 42.2 | 1.8 | 3,300 |
| 41 | 20.1 | 0.35 | 17.5 | 50.1 | 1.4 | 7,200 |

B. ANALYSES OF FEEDS AND SPENT NAPHTHAS (LIQUID VOLUME PERCENT)

| Run No. | 38 | | 34 | | 39 | | 40 | | 41 | |
|---|---|---|---|---|---|---|---|---|---|---|
| | Feed | Spent | Feed | Spent | Feed | Spent | Feed | Spent | Feed | Spent |
| Component: | | | | | | | | | | |
| $C_3$ | 0 | 0 | 0.5 | 0 | 0 | 0 | 0 | 0 | 0 | 0 |
| Isobutane | 19.5 | 17.4 | 17.5 | 19.6 | 19.2 | 23.1 | 16.7 | 18.3 | 15.9 | 17.0 |
| n-Butane | 51.6 | 58.1 | 49.5 | 52.6 | 43.7 | 48.5 | 46.3 | 55.6 | 44.2 | 55.6 |
| Isobutylene | 6.2 | 1.7 | 11.5 | 4.4 | 12.5 | 4.1 | 15.7 | 2.4 | 20.1 | 3.3 |
| Butene-1 | 10.9 | 10.1 | 9.8 | 10.5 | 11.1 | 11.7 | 10.5 | 10.6 | 9.0 | 9.9 |
| Cis butene-2 | 3.9 | 4.8 | 4.6 | 4.6 | 4.8 | 4.7 | 3.7 | 4.6 | 3.8 | 5.1 |
| Trans butene-2 | 6.7 | 6.9 | 5.9 | 7.1 | 7.0 | 7.4 | 6.0 | 7.4 | 5.6 | 7.7 |
| Butadiene | 0.3 | 0.3 | 0.3 | 0.4 | 0.4 | 0.4 | 0.4 | 0.4 | 0.3 | 0.4 |
| $C_5+$ | 0.9 | 0.8 | 0.4 | 0.8 | 1.3 | 0.1 | 0.7 | 0.9 | 1.1 | 1.0 |

The above data show that the yield of polymer increases from 4.9 to 17.5% and polymer viscosities range from 400 to 7,200 cs. as the isobutylene concentration is increased from 6 to 20%.

The data obtained in Examples 8 and 9 indicate how a given viscosity product can be obtained by correlating the amount of isobutylene in the feed with the isobutylene in the spent naphtha (conversion). This correlation shows for example that a 660 cs. product may be prepared from a feed containing 16% isobutylene at a very high conversion level of about 0.5% isobutylene in the spent naphtha. On the contrary, if there is only 7% isobutylene in the feed then the conversion must be very low (5% isobutylene in spent naphtha).

Having thus described the invention what is claimed as new and useful and desired to be secured by Letters Patent is:

1. The process of selectively polymerizing isobutylene from its admixture with other olefins of 3 to 5 carbon atoms which comprises cooling and liquefying a hydrocarbon material consisting substantially of normal butenes, isobutene, and butane, the amount of isobutene being about 6 to 20% of the entire reaction mixture, and refluxing the cooled hydrocarbon material at 0° C. in the presence of 0.05% to 0.83% by weight, based on the feed, of solid, powdered, anhydrous aluminum chloride, whereby substantially complete polymerization of the isobutylene is obtained but substantially no other butenes are polymerized.

2. The process of selectively polymerizing isobutylene from its admixture with other olefins which comprises cooling and liquefying a hydrocarbon material consisting substantially of normal butenes, isobutene and butane, the amount of isobutene being about 6 to 20%, refluxing the cooled hydrocarbon material at 0° C. in the presence of 0.005% to 0.083% by weight, based on the total feed of aluminum chloride, dissolved in ethyl chloride, whereby substantially complete polymerization of the isobutylene is obtained but substantially no other butene is polymerized.

3. The process of selectively polymerizing butene-1 from its admixture with cis and trans butene-2, which comprises cooling and liquefying a hydrocarbon material consisting of butene-1, and cis and trans butene-2 as substantially the only olefins present, refluxing the cooled hydrocarbon material at 0° C. in the presence of 5% by weight based on the feed of solid powdered aluminum chloride, whereby substantially complete polymerization of butene-1 is obtained but substantially no butene-2 is polymerized.

4. The process of selectively polymerizing isobutylene from a petroleum hydrocarbon $C_4$ fraction having the following analysis (by volume):

| | Per cent |
|---|---|
| Propane | 0–0.5 |
| Isobutane | 15.9–21.0 |
| n-Butane | 35.5–51.6 |
| Isobutylene | 6.2–20.1 |
| Butene-1 | 9.0–12.4 |
| Cis butene-2 | 3.5–4.8 |
| Trans butene-2 | 5.6–7.0 |
| Butadiene | 0.3–0.5 |
| $C_5+$ | 0.4–6.6 | which comprises cooling and liquefying said $C_4$ fraction, and refluxing it at about 0° C. and at atmospheric pressure, in the presence of 0.05% to 0.35% by weight, based on the feed, of sublimed anhydrous aluminum chloride powder, for a reaction time of 5 to 30 minutes, whereby substantially complete polymerization of the isobutylene is obtained, to produce a viscous oily polymer, but substantially no other butenes are polymerized.

5. The process of selectively polymerizing isobutylene from its admixture with other olefins which comprises bringing into contact with a catalyst, chosen from the class consisting of solid powdered aluminum halide, said aluminum halide being present in proportions of 0.05% to 0.083% based on the feed, and aluminum halide dissolved in ethyl chloride, said aluminum halide-ethyl chloride solution being present in proportions of 0.005% to 0.083%, based on the feed, an initial hydrocarbon material consisting substantially entirely of hydrocarbons of 3 to 5 carbon atoms per molecule in major art, the said initial hydrocarbon material containing both normal olefin and isoolefins and being accompanied by corresponding saturated aliphatic hydrocarbon, at a temperature of about −40° C., to about +50° C., whereby substantially polymerization of isobutylene is obtained but substantially no other olefins are polymerized.

6. The process of selectively polymerizing isobutylene from its admixture with other olefins which comprises bringing into contact with a catalyst, chosen from the class consisting of solid powdered aluminum chloride, said aluminum chloride being present in proportions of 0.05 to 0.83% by wt., based on the feed, and aluminum chloride dissolved in ethyl chloride, said dissolved aluminum chloride being present in proportions of 0.005% to 0.083% based on the feed, an initial hydrocarbon material consisting substantially of butene-1, butene-2, isobutylene and butane at a temperature of −25° C., to +38° C., for a time of 30 minutes, whereby substantially complete polymerization of the isobutylene is obtained but substantially no other butenes are polymerized.

7. The process according to claim 6 in which the resulting isobutene free mixture of butene-1 and butene-2 is further contacted with a sufficient amount of aluminum chloride to make a total of 5%, whereby the butene-1 is substantially completely polymerized but substantially no butene-2 is polymerized.

8. The process according to claim 7 in which the temperature is raised above 0° C., after all the butene-1 has been polymerized, for a time sufficient to polymerize all of the remaining olefins present consisting essentially of cis-butene-2 and trans-butene-2.

9. The process of selectively polymerizing isobutylene and butene-1 from their admixture with other olefins which comprises cooling and liquefying a $C_4$ petroleum hydrocarbon fraction containing butene-1, butene-2, and isobutylene, and refluxing the cooled hydrocarbon material at 0° C. in the presence of 0.05 to 0.83% by weight of powdered aluminum chloride whereby substantially complete polymerization of the isobutylene is obtained, then adding a sufficient amount of additional aluminum chloride to bring the total amount up to 5% by weight, and continuing the polymerization for a period of time up to 30 minutes whereby substantially complete polymerization of butene-1 is obtained but substantially no butene-2 is polymerized.

HELMUTH G. SCHNEIDER.
HANS G. GOERING.

References Cited in the file of this patent

UNITED STATES PATENTS

| Number | Name | Date |
|---|---|---|
| 2,065,474 | Mueller-Cunradi et al. | Dec. 22, 1936 |
| 2,084,082 | Fitch | June 15, 1937 |
| 2,084,501 | Otto et al. | June 22, 1937 |
| 2,320,256 | Bailey et al. | May 25, 1943 |
| 2,387,784 | Thomas et al. | Oct. 30, 1945 |
| 2,458,977 | Carmody | Jan. 11, 1949 |